United States Patent [19]

Kataoka

[11] E Re. 28,684

[45] Reissued Jan. 20, 1976

[54] APPARATUS FOR AUTOMATICALLY CONNECTING SHUTTER SLAT AND PREVENTING ITS DISENGAGEMENT

[75] Inventor: Hiroshi Kataoka, Osaka, Japan

[73] Assignee: Overhead Door Corporation, Dallas, Tex.

[22] Filed: Feb. 11, 1974

[21] Appl. No.: 441,554

Related U.S. Patent Documents

Reissue of:

[64] Patent No.: 3,651,555
Issued: Mar. 28, 1972
Appl. No.: 72,732
Filed: Sept. 16, 1970

[52] U.S. Cl. ..... 29/208 D
[51] Int. Cl. ..... B23p 19/04
[58] Field of Search ..... 29/208 D, 200 B, 208 R, 29/200 R

[56] References Cited

UNITED STATES PATENTS

| | | | |
|---|---|---|---|
| 3,466,727 | 9/1969 | Buker et al. | 29/200 B |
| 3,503,111 | 3/1970 | Janecek | 29/208 D X |
| 3,651,555 | 3/1972 | Kataoka | 29/208 D |

*Primary Examiner*—Thomas H. Eager
*Attorney, Agent, or Firm*—Woodhams, Blanchard and Flynn

[57] ABSTRACT

Apparatus for automatically connecting shutter slat and preventing its disengagement, which automatically connects one shutter slat with another having a notch and slots for preventing its disengagement and cut in the specified dimension, and also prevents the connected shutter slats from being disengaged from each other.

12 Claims, 5 Drawing Figures

APPARATUS FOR AUTOMATICALLY CONNECTING SHUTTER SLAT AND PREVENTING ITS DISENGAGEMENT

Matter enclosed in heavy brackets [ ] appears in the original patent but forms no part of this reissue specification; matter printed in italics indicates the additions made by reissue.

BACKGROUND OF THE INVENTION

The present invention relates to apparatus for automatically connecting shutter slat and preventing its disengagement, and more particularly to apparatus which automatically connects one shutter slat with another having a notch and slots for preventing its disengagement, and which also prevents the connected shutter slats from being disengaged from each other without using conventional stop plate.

As is well known, shutter slats are connected by engaging the lower curved connecting edge of one shutter slat with the upper curved connecting edge of another shutter slat, but in this condition without any means to stop them, they are apt to get out of position or be disengaged.

Formerly, the only way to prevent this was to attach stop plates at the end of the connected shutter slats, but recently a new method of preventing disengagement of slats without using any stop plate has been developed.

According to this method, a notch is made in one part of the upper curved connecting edge of each shutter slat, and in a position of the lower curved connecting edge corresponding to that of said notch are provided a pair of slots, forming a tongue-shaped piece, which is bent after connecting the upper curved connecting edge of said each shutter slat with that of the lower curved connecting edge of each shutter slat adjacent thereto, so that the both sides of the tongue-shaped piece cross and contact the inside surface of the portion of the upper curved connecting edge having said notch.

The object of this invention is to provide an improved apparatus for automatically connecting efficiently shutter slats and preventing them from being disengaged in the above mentioned way.

SUMMARY OF THE INVENTION

Briefly, appparatus for automatically connecting shutter slat and preventing its disengagement according to this invention comprises a feed means that moves the shutter slat to the connecting position, while guiding it exactly; a forward feed means that moves the shutter slat, which has been moved to this connecting position, to the holding position one pitch ahead and holds it there; and a press means provided ahead of said holding position in order to prevent it from being disengaged.

In a preferred embodiment of the invention, said feed means, said forward feed means and said press means are so designed that they are interlocked with each other. However, as such a design can be made easily by prior art, I omit a detailed description of the electric circuit and oil pressure circuit of said means.

Next, the shutter slat which is moved to the connecting position by said feed means may be conveyed either on the roller conveyor as shown in the preferred embodiment mentioned below, or it may be moved simply on the smooth floor.

And said forward feed means may be either fixed on to the bed or so designed that it may move slidingly and freely on the bed.

BRIEF DESCRIPTION OF THE DRAWING

The nature and objects of the invention will be more fully apparent from the following detailed description of preferred embodiments thereof, taken in connection with the accompanying drawings in which.

DETAILED DESCRIPTION

Figure 1:
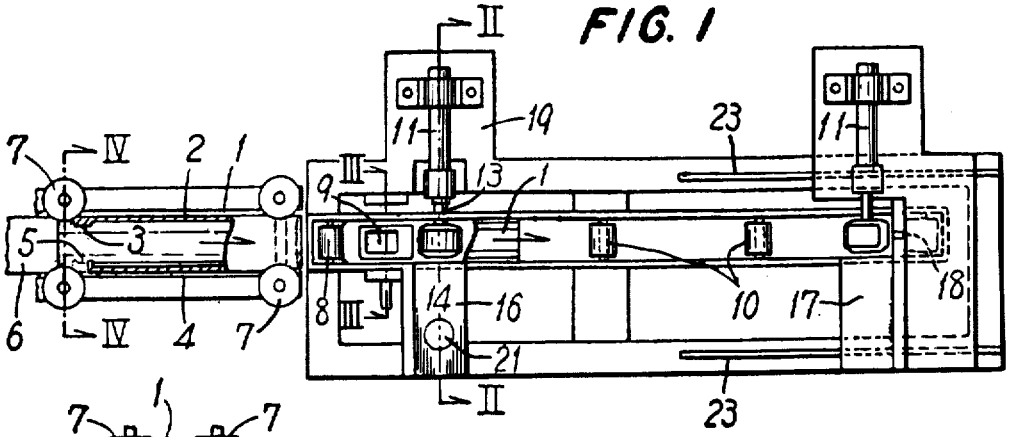
FIG. 1 is a plan view of an apparatus for automatically connecting shutter slat and preventing its disengagement embodying the present invention.
Figure 4:
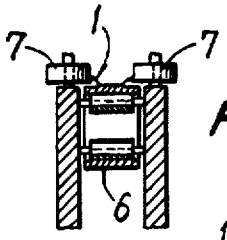
FIG. 4 is a cross sectional view of the apparatus for automatically connecting shutter slat and preventing its disengagement taken on line IV—IV of FIG. 1.
Figure 5:
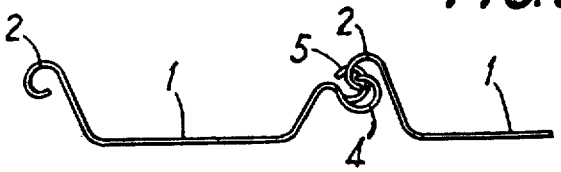
FIG. 5 is a side elevation of the shutter slat showing its important part in condition in which it is connected and how it is prevented from being disengaged.

As shown in FIG. 1 and FIG. 5, a shutter slat 1 used for the apparatus according to the present invention has a notch 3 in its upper curved connecting edge 2, and a tongue-shaped piece formed by a pair of slots in its lower curved connecting edge 4.

Said shutter slat 1 is moved exactly to the feed means by means of a belt conveyor 6 and a guide roll 7.

Figure 3:
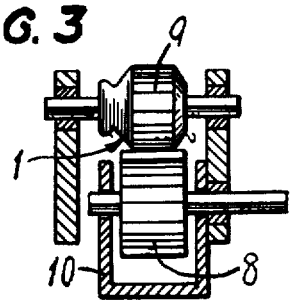
FIG. 3 is an enlarged cross sectional view of the apparatus for automatically connecting shutter slat and preventing its disengagement taken on line III—III of FIG. 1.

As shown in FIG. 1 and FIG. 3, the feed means comprises a driving roll 8 driven by a prime mover and a feed roll 9 having a surface exactly fitting the upper surface of said shutter slat 1.

Between said driving roll 8 and feed roll 9 the shutter slat 1 is guided along exactly on the roller conveyor 10 to the connecting position on the right.

Figure 2:
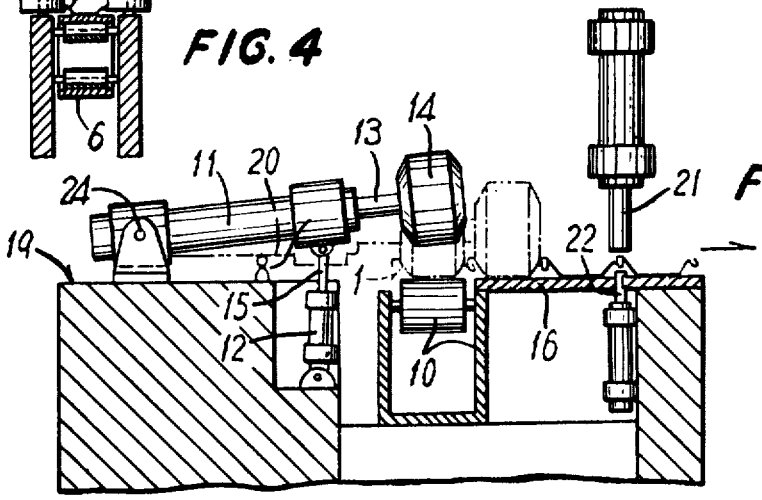
FIG. 2 is an enlarged cross sectional view of the apparatus for automatically connecting shutter slat and preventing its disengagement taken on line II—II of FIG. 1.

Forward feed means comprises, as shown in FIG. 1 and FIG. 2, a pair of piston rod operating means 11, 11 positioned perpendicularly to the longitudinal direction of said shutter slat 1 which is moved to the connecting position, and a pair of piston rod operating means 12, 12 that make 11, 11 horizontal or incline them.

Said piston rod operating means 11, 11 are so designed that the portion of the piston rod 13 which is outside the cylinder is lengthened or shortened by oil pressure or the like, and on the end of the piston rod 13 is attached a fitting piece 14 that fits the upper surface of slat 1.

Said piston rod operating means 12, 12 are so designed that the portion of the piston rod 15 which is outside the cylinder is lengthened or shortened by oil pressure or the like.

Ahead of said forward feed means are provided L-shaped guide plates 16, 17, and the shutter slat 1 in said connecting position is moved forward, guided by its vertical and horizontal portions.

To the vertical portion of the L-shaped plate 17 is mounted a limit switch 18, which operates when the end of the shutter slat 1 touches it, and on the bed 19 right under the piston rod operating means 11 is mounted a limit switch 20 that operates when the piston rod operating means 11 lowers to horizontal position.

The press means comprises a pair of punches 21, 22 that rise and lower, and as shown in FIG. 5, pressing and bending the tongue-shaped piece 5 provided in the lower curved connecting edge 4 of the shutter slat 1, it prevents it from being disengaged.

23, 23 are the rails provided on the bed 19, on which said right forward feed means and the L-shaped guide plate 17 move sliding.

The apparatus being thus constructed, when the shutter slat 1 is moved to the connecting position by the feed means, the limit switch 18 provided on the vertical portion of the L-shaped guide plate 17 operates, thereby causing said piston rod operating means 12, 12 to operate, shortening the part of the piston rod 15 which is outside the cylinder, and the piston rod operating means 11, 11 connected to said piston rods 15 lower to the horizontal position, turning down with the fulcrum 24 as the center, and the fitting piece 14 fits in said shutter slat 1. Then the limit switch 20 operates, lengthening that portion of the piston rod 13 which is outside the cylinder, thereby moving the shutter slat 1 to the holding position one pitch ahead, and holding it in this position for a while.

While the shutter slat 1 is held in said holding position, the next shutter slat 1 is moved to the connecting position by the feed means. Thus, with the upper curved connecting edge 2 of the shutter slat 1 which is held in this position, is engaged the lower curved connecting edge 4 of the next shutter slat 1 that is moved to the upper curved connecting edge 2, thereby connecting one shutter slat with another.

During the interval from the time the shutter slat 1 begins to be connected till it is finished, the piston rod operating means 11, 11 and 12, 12 operate, putting the fitting piece 14 in said holding position. Then the press means operates, and bending upward the tongue-shaped piece 5 which is provided on the lower curved connecting edge 4, as shown in FIG. 5, thereby preventing the shutter slat from being disengaged.

When connecting of the shutter slat 1 is finished, said limit switch 18 operates again, making the fitting piece 14 fit in the shutter slat 1 in the connecting position, and moving it one pitch ahead, holds it. Thus, the procedure from the shutter slat beginning to be conected and the fitting piece 14 being put back to the original position to the press means operating, is repeated, and thus the shutter slat 1 is connected with the next one, preventing it from being disengaged and moving it forward.

Although the invention has been particularly shown and described, it is contemplated that various changes and modifications may be made without departing from the scope of the invention as set forth in the following claims.

I claim:

1. Apparatus for automatically connecting shutter slat and preventing its disengagement which comprises: a feed means which moves the shutter slat having a notch and slots for preventing its disengagement and cut in specified dimension, to the connecting position while guiding it exactly; a forward feed means that moves the shutter slat, which is moved to said connecting position, to the holding position and holds it there; and a press means provided ahead of said holding position in order to prevent the connected shutter slat from being disengaged, thereby automatically connecting shutter slats that are sent to the connecting position one after another, and preventing the connected slats from being disengaged.

*2. An apparatus according to claim 1, wherein said slat is elongated and has hooklike portions on the opposite longitudinally extending edges thereof, said notch being formed in said slat adjacent one edge thereof and said slots being formed in said slat adjacent the other edge thereof for forming a bendable tongue;*

*said first-mentioned feed means moving said slat in a first direction which is substantially parallel to the longitudinal direction thereof for positioning said slat in said connecting position; and*

*said forward feed means moving said slat in a second direction which is substantially perpendicular to said first direction from said connecting position into said holding position, said holding position being spaced from said connecting position by a distance substantially equal to the width of said slat whereby the hooklike portion formed on one edge of said slat becomes engaged with the hooklike portion formed on the other edge of a further slat when said further slat is moved into said connecting position by said first-mentioned feed means.*

*3. An apparatus according to claim 2, wherein said forward feed means includes an engaging member adapted for engagement with a slat for moving same from said connecting position to said holding position, said forward feed means also including driving means connected to said engaging member for moving same horizontally between said connecting position and said holding position and for raising same vertically relative to said slat.*

*4. An apparatus according to claim 3, wherein said slat has a channel-like cross section which opens upwardly when in said connecting and holding positions, said engaging member being moved vertically downwardly into the interior of said slat when same is in said connecting position for engaging said slat, said driving means displacing said engaging member horizontally after it engages said slat for moving said slat from said connecting position to said holding position, said driving means raising said engaging member vertically upwardly so as to disengage said slat after it has been moved to said holding position and additionally horizontally returning said engaging member to a position wherein it is disposed above said connecting position.*

*5. An apparatus according to claim 4, wherein said driving means includes first fluid pressure cylinder means having extendible ram means connected to said engaging member and movable primarily in a horizontal direction, said first cylinder means being mounted for at least limited pivotal movement about a substantially horizontal axis, and said driving means including second fluid pressure cylinder means having a substantially vertically extendible ram interconnected to said first cylinder means for vertically swinging same for causing raising and lowering of said engaging member.*

*6. An apparatus according to claim 4, wherein said driving means includes a first drive device interconnected to said engaging member for moving same horizontally and a second drive device interconnected to said engaging member for moving same vertically.*

*7. An apparatus according to claim 6, wherein said press means includes a pair of movable press members disposed in opposed relationship to one another, one of said press members being positioned above said slats and*

*movable downwardly toward said slats, the other press member being disposed below said slats in substantial alignment with said one press member and being movable upwardly toward said slats, whereby movement of said pair of press members into engagement with said slats causes the tongue on one slat to be deformed into the notch formed in an adjacent slat for preventing said slats from being disengaged due to relative movement therebetween in the longitudinal direction thereof.*

*8. An apparatus according to claim 2, wherein said forward feed means includes a pair of substantially identical feed devices positioned adjacent said connecting position and spaced from one another in the longitudinal direction of said slat, each of said feed devices having an engaging member positioned for engaging a slat located at said connecting position and for moving said slat substantially horizontally into said holding position.*

*9. An apparatus according to claim 8, including stationary frame means, slide means slidably mounted on said frame means for linear movement relative thereto in a direction substantially parallel to said first direction, said slide means having one of said feed devices mounted thereon and additionally having abutment means thereon positioned in alignment with said first direction and disposed for engaging the leading end of said slat as same is moved into said connecting position for controlling the proper positioning of said slat.*

*10. An apparatus according to claim 9, wherein the engaging member associated with each of said feed devices is mounted for both horizontal and vertical movement relative to said frame means, and each of said feed*

*devices including drive means for displacing the respective engaging member both vertically and horizontally.*

*11. An apparatus according to claim 2, wherein said press means includes a pair of movable press members disposed in opposed relationship to one another, one of said press members being positioned above said slats and movable downwardly toward said slats, the other press member being disposed below said slats in substantial alignment with said one press member and being movable upwardly toward said slats, whereby movement of said pair of press members into engagement with said slats causes the tongue on one slat to be deformed into the notch formed in an adjacent slat for preventing said slats from being disengaged due to relative movement therebetween in the longitudinal direction thereof.*

*12. An apparatus according to claim 2, wherein said first-mentioned feed means includes conveyor means for moving said slats longitudinally thereof in said first direction, said first-mentioned feed means further including a pair of opposed rollers disposed vertically one above the other for rotation about substantially horizontal axes, said rollers being adapted to have said slat longitudinally fed through a nip defined between said rollers, one of said rollers having a peripheral contour similar to the cross-sectional shape of said slat for assisting in guiding same, and power means drivingly connected to one of said rollers for rotatably driving same, whereby said rollers feed said slat along said first direction into said connecting position.*

* * * * *